United States Patent [19]

Hiraiwa et al.

[11] Patent Number: 4,991,699
[45] Date of Patent: Feb. 12, 1991

[54] PARKING BRAKE APPARATUS

[75] Inventors: Kazuyoshi Hiraiwa; Tadao Takimoto, both of Hamamatsu, Japan

[73] Assignee: Rhythm Motor Parts Mfg. Co., Ltd., Shizuoka, Japan

[21] Appl. No.: 376,031

[22] Filed: Jul. 6, 1989

[30] Foreign Application Priority Data

Jul. 13, 1988 [JP] Japan .................. 63-92743[U]
Jul. 13, 1988 [JP] Japan .................. 63-92744[U]

[51] Int. Cl.$^5$ .......................................... B60K 41/20
[52] U.S. Cl. ........................ 192/1.34; 74/388 R; 192/9
[58] Field of Search ............ 192/1.31, 1.34, 9; 74/388 R, 388 PS; 188/355

[56] References Cited

U.S. PATENT DOCUMENTS

| | | | |
|---|---|---|---|
| 1,954,801 | 4/1934 | Davidson | 188/355 X |
| 2,096,396 | 10/1937 | Gates | 188/355 X |
| 2,724,282 | 11/1955 | Blattmann | 74/388 R |
| 2,763,990 | 9/1956 | Mercier | 192/91 X |
| 2,910,156 | 10/1959 | Apple | 192/1.31 |
| 2,922,400 | 1/1960 | Lorence | 74/388 R X |
| 3,270,840 | 9/1966 | De Claire | 192/1.34 X |
| 4,224,832 | 9/1980 | Prohaska et al. | 74/388 R |
| 4,561,527 | 12/1985 | Nakamoto et al. | 192/9 X |
| 4,629,043 | 12/1986 | Matsuo et al. | 192/1.31 X |

Primary Examiner—Rodney H. Bonck
Attorney, Agent, or Firm—Lane, Aitken & McCann

[57] ABSTRACT

A parking brake apparatus comprising a manipulation lever; an actuator; a balance lever connected at its one end through a first coupling member with the manipulation lever so that a manipulated force of the manipulation lever acts on the one end and at its outer end through a second coupling member with the actuator so that an operating force of the actuator acts on the other end, the balance lever having a portion on with a parking brake force acts; relative displacement detecting unit for detecting a relative displacement between the manipulation lever and the actuator; and control means unit for controlling the actuator so that the relative displacement detected by the relative displacement detecting unit is reduced.

7 Claims, 6 Drawing Sheets

PARKING BRAKE APPARATUS

FIELD OF THE INVENTION

The present invention relates to a parking brake apparatus having an actuator for reducing the manipulated force of a manipulation lever.

DESCRIPTION OF THE PRIOR ART

There is known a conventional parking brake apparatus wherein the parking brake thereof is operated by a manipulation lever and an actuator is employed to reduce the manipulated force of the manipulation lever. This apparatus has its advantage in that the manipulation lever can be lightly pulled by the power assisted by the actuator. However, in the above conventional parking brake apparatus, a sufficient power assist cannot be obtained because it is difficult to balance the manipulated quantity of the manipulation lever and the operating force of the actuator.

Also, there is known a conventional parking brake apparatus wherein the actuator thereof is operated by the manipulation of a manipulation switch and the parking brake operated. This apparatus has its advantage in that the manipulation of a manipulation lever is not needed and the parking brake is easily operated and released only by the manipulation switch. Although in this apparatus the manipulation of a lever is not needed, the lever manipulation is desirable for some people who are not used to the manipulation switch. Particularly, in the case of manual transmission vehicles, the lever manipulation is more preferable in the start in sloping roads. However, there are no parking brake apparatuses which are capable of being operated by both a manipulation lever and a manipulation switch.

Accordingly, it is an object of the present invention to provide an improved parking brake apparatus wherein the relative displacement quantity between the manipulated quantity of a manipulation lever and the operating quantity of an actuator is detected and the relative displacement quantity thus reduced.

Another object is to provide an improved parking brake apparatus which is capable of being operated and released by both a manipulation lever and a manipulation switch.

SUMMARY OF THE INVENTION

In accordance with one important aspect of the present invention, there is provided a parking brake apparatus comprising: a manipulation lever; an actuator; a balance lever connected at its one end through a first coupling member with the manipulation lever so that a manipulated force of the manipulation lever acts on the one end and at its other end through a second coupling member with the actuator so that an operating force of the actuator acts on the other end, the balance lever having a portion on which a parking brake force acts; relative displacement detecting means for detecting a relative displacement between the manipulation lever and the actuator; and control means for controlling the actuator so that the relative displacement detected by the relative displacement detecting means is reduced.

The parking brake apparatus may further comprise stop means that is provided in the vicinity of the balance lever and adapted to regulate the balance lever so that the relative displacement becomes less than a fixed value.

The first and second coupling members may be freely slidable so that the balance lever can be moved only when one of the manipulation lever or the actuator is operated.

Only one of the first and second coupling members may be freely slidable so that the balance lever can be moved only when one of the manipulation lever or the actuator is operated.

In accordance with another important aspect of the present invention, in a parking brake apparatus which is operated by the manipulation of a parking brake manipulation lever and wherein an actuator is provided to reduce a manipulated force of the parking brake manipulation lever, the parking brake apparatus comprising: a manipulation switch for operating and releasing the actuator without manipulating the manipulation lever; and control means for controlling the operation and release of a parking brake caused by the the actuator on the basis of an output of the manipulation switch.

The control means may comprise a balance lever having its one end on which the manipulated force of the manipulation lever acts, its other end on which the operating force of the actuator acts and its intermediate portion on which a brake force of the parking brake acts; relative position displacement detecting means for detecting a relative position displacement between the manipulation lever and the actuator; brake force detecting switch for detecting the brake force transmitted to the parking brake; and a control part for controlling the actuator on the basis of the output of the manipulation switch, an output of the relative position displacement detecting means and an output of the brake force detecting switch.

The control means may further comprise brake manipulation detecting means for detecting a manipulated quantity of a brake pedal, and accelerator manipulation detecting means for detecting a manipulated quantity of an accelerator pedal, and when the manipulation switch is operated with a detection output of the brake manipulation detecting means obtained, the parking brake being operated by the actuator, and when a detection output of the accelerator manipulation is obtained after the operation of the parking brake, the parking brake being released by the actuator.

BRIEF DESCRIPTION OF THE DRAWINGS

The above and other objects and advantages will become apparent from the following detailed description when read in conjunction with the accompanying drawings wherein.

DESCRIPTION OF THE PREFERRED EMBODIMENTS

Figure 1:
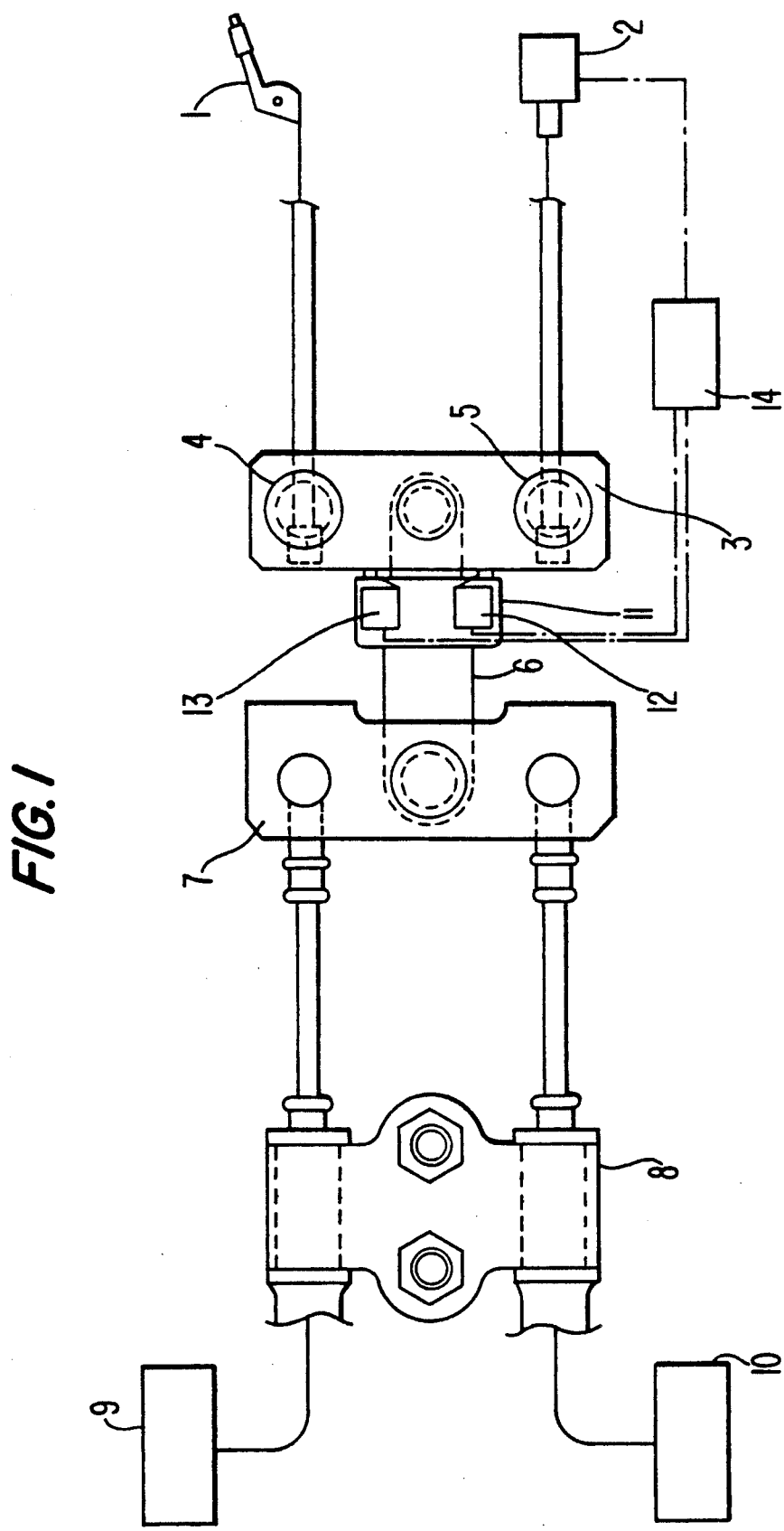
FIG. 1, is a schematic plan view showing the overall construction of a first embodiment of the present invention.
Figure 2:
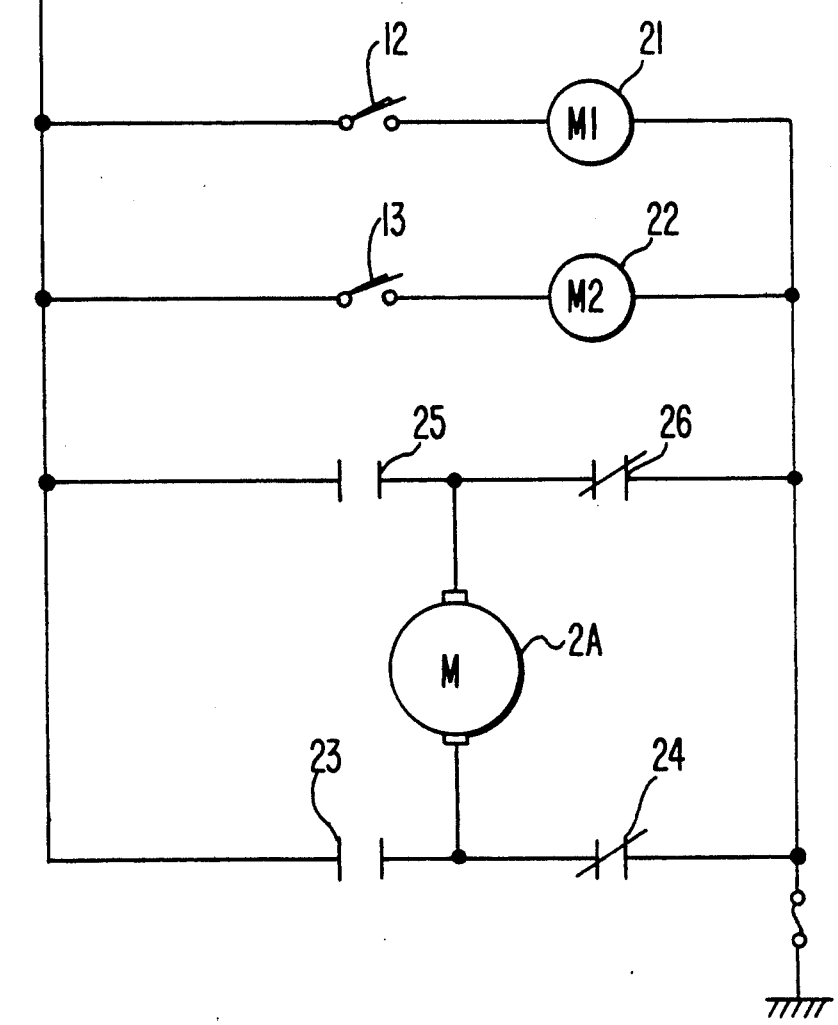
FIG. 2 is a diagram showing the control circuit of FIG. 1.

Referring now in greater detail to the drawings and initially to FIGS. 1 and 2, there is shown a preferred embodiment of a parking brake apparatus in accordance with the present invention.

In FIG. 1, a manipulation lever is denoted by 1, an actuator by 2 and a balance lever 3. The balance lever 3 is connected at its one end with the manipulation lever 1 so that the manipulated force of the manipulation lever 1 acts on the one end, and at its other end with the actuator 2 so that the operating force of the actuator 2 acts on the other end. A parking brake force acts on the intermediate portion of the opposite ends of the balance lever 3.

4 denotes a first coupling member of the manipulation lever 1 and the balance lever 3, and 5 a second coupling member of the actuator 2 and the balance lever 3. These coupling members 4 and 5 are constructed so as to be freely slidable and so that when only one of the manipulation lever 1 and actuator 2 is operated, the coupling member of the manipulation 1 or actuator 2 that is not operated is slid not so as to disturb the movement of the balance lever 3. Although in the embodiment of FIG. 1 the two coupling members 4 and 5 are provided in the balance member 3, it is noted that only the slidable coupling member 5 may also be provided in one end of the balance member 3 connected with the actuator 2, and the other end may be fixedly connected with the manipulation lever 1.

The balance lever 3 is connected through a third coupling member 6 with an equalizer 7, which is connected through a bracket member 8 with a brake unit of rear wheels 9 and 10. A stop member or stop means 11 is mounted on the third coupling member 6 adjacent the balance member 3, the stop member 11 being adapted to regulate the relative displacement quantity of the balance member 3 less than a fixed value. That is, the stop member 11 regulates the tilt of the balance member 3 less than a fixed value.

On the stop member 11, there is provided a pair of relative displacement detecting switches (relative displacement detecting means) 12 and 13. The relative displacement detecting switches 12 and 13 output relative displacement detection signals to a control circuit (control means) 14, respectively.

The control circuit 14 controls the actuator 2 so that the relative displacement quantity is reduced in response to the relative displacement detection signals of the relative displacement detecting switches 12 and 13.

FIG. 2 illustrates the construction of the control circuit 14 of FIG. 1. In FIG. 2, the aforesaid relative displacement detecting switch is designated by 12 and the aforesaid relative displacement detecting switch by 13. 21 denotes a first relay for motor positive rotation that switches when the switch 12 is closed, and 22 denotes a second relay for motor reverse rotation that switches when the switch 13 is closed.

23 denotes a normally open contact of the first relay 21, 24 a normally closed contact of the first relay 21, 25 a normally open contact of the second relay 22, and 26 a normally closed contact of the second relay 22.

When the normally open contact 23 is closed and the normally closed contact 24 is opened by the switching of the first relay 21, an electric motor 2A forming the actuator 2 is rotated in the positive direction. On the other hand, when the normally open contact 25 is closed and the normally closed contact 26 is opened by the switching of the second relay 22, the electric motor 2A is rotated in the reverse direction.

The operation of the embodiment shown in FIGS. 1 and 2 will hereinafter be described in detail.

When the manipulation lever 1 is pulled up, the balance lever 3 is tilted and therefore the relative displacement detecting switch 12 is turned on and the first relay 21 is turned on. Since the normally open contact 23 is closed and the normally closed contact 24 is opened by the first relay 21 that has switched, the electric motor 2A rotates in the positive direction. Because of the positive rotation of the electric motor 2A, the balance lever 3 is balanced. This causes the relative displacement detecting switch 12 and also the first relay 21 to be turned off. As a result, the electric motor 2A is stopped. In this manner, the parking brake can be operated by the assist of the actuator 2.

Next, when the manipulation lever 1 is returned to its original position, the balance lever 3 is tilted in the opposite direction to the above case. The relative displacement detecting switch 13 and the second relay 22 are consequently turned on.

Since the normally open contact 25 is closed and the normally closed contact 26 is opened by the second relay 22 that has switched, the electric motor 2A rotates in the reverse direction. Because of the reverse rotation of the electric motor 2A, the balance lever 3 is balanced. This causes the relative displacement detecting switch 13 and also the second relay 22 to be turned off. As a result, the electric motor 2A is stopped. In this manner, the parking brake can be released.

It is noted that, in the case that the actuator 2 is not operated, if the manipulation lever 1 is pulled, the balance lever 3 will be tilted but not tilted more than a fixed value since it is brought into engagement with the stop member 11. Also, since the coupling member 5 is slidable, the parking brake can be operated without a loss of force.

As described above, in the present invention, since the actuator is operated so that the relative displacement quantity between the manipulation lever and the actuator can be reduced by detecting the relative displacement, a sufficient power assist can be obtained. It is noted that a power assist ratio can be changed by providing the coupled portion of the balance lever and coupling member in a position which is shifted toward the side of the manipulation lever or the side of the actuator. Further, since the stop means is provided so that the relative displacement of the manipulation lever and actuator becomes less than a fixed value and also the coupling members between the balance member and the actuator and between the balance member and the manipulation lever are slidable, the balance member is easily moved and the parking brake can be operated without a loss of force even in the case that the actuator is not operated.

Figure 3:
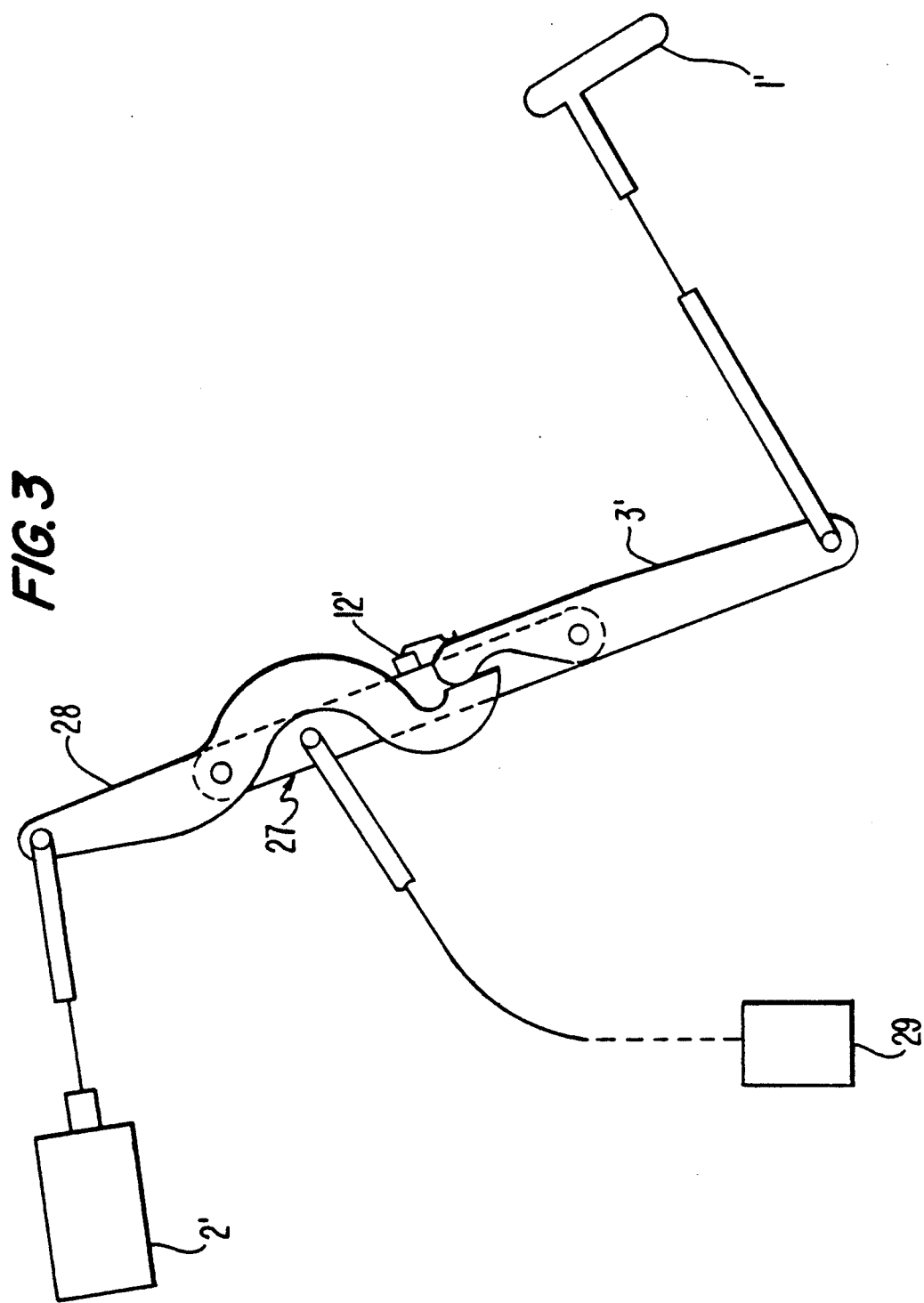
FIG. 3 is a schematic view showing a second embodiment of the present invention.

FIG. 3 shows a second embodiment of the present invention that is like that shown in FIGS. 1 and 2, except that an assist lever and a brake lever are provided. In FIG. 3, 1' denotes a manipulation lever, 2' an actuator, 3' a balance lever, 12' a relative displacement detecting switch, 27 a brake lever, 28 an assist lever, and 29 a parking brake.

FIGS. 4 through 7 show a third embodiment of the present invention.

Figure 4:
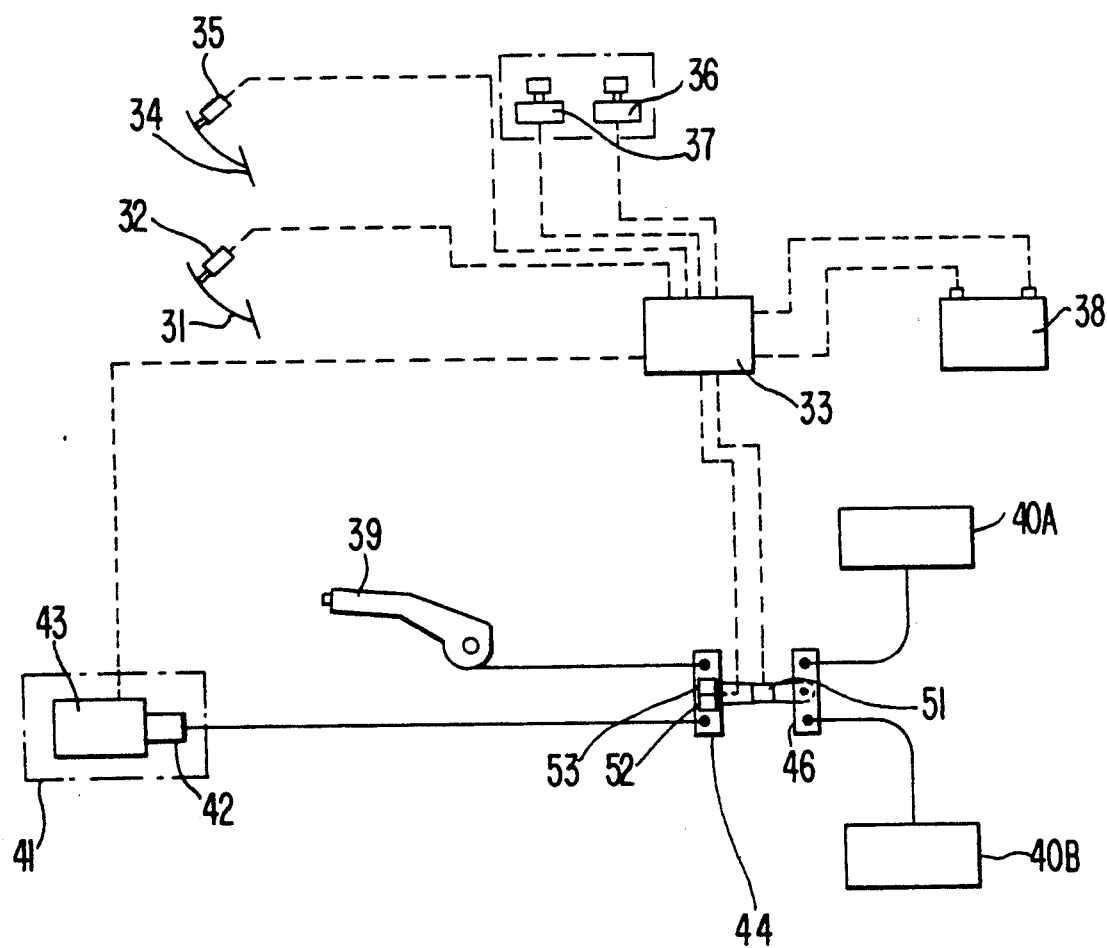
FIG. 4 is a schematic block diagram showing the overall construction of a third embodiment of the present invention.

In FIG. 4, 31 denotes a brake pedal and 32 denotes a brake detecting switch for detecting the manipulation of the brake pedal 31. The brake detecting switch 32 inputs its detection signal to a control circuit or control means 33. 34 denotes an accelerator pedal and 35 denotes an accelerator detecting switch for detecting the manipulation of the accelerator pedal 34. The detection signal of the accelerator detecting switch 35 is inputted to the control circuit 33.

36 is a manipulation switch for operation and 37 a manipulation switch for release, each output of these manipulation switches 36 and 37 being inputted to the control circuit 33. A battery charger 38 supplies an electric power to the control circuit 33.

A manipulation lever denoted by 39 applies a parking brake force to a brake unit (not shown) of rear wheels 40A and 40B. An actuator denoted by 41 is controlled by the control circuit 33 and has a speed reducer 42 and an electric motor 43. The actuator 41 assists the manipulation lever 39 and also applies the parking brake force to the brake unit by the manipulation of the manipulation switches 36 and 37.

Figures 5, 6:
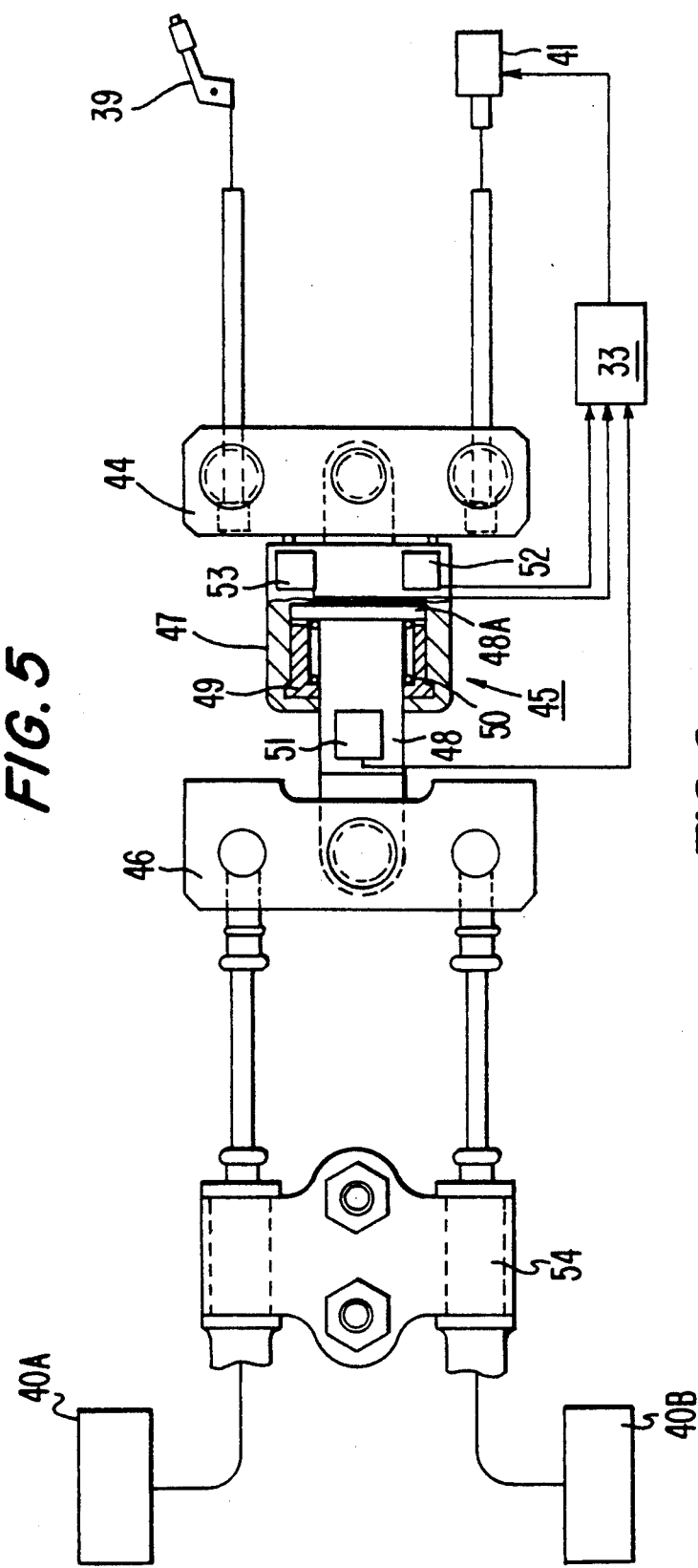
FIG. 5 is an enlarged view showing the control circuit and control mechanism of FIG. 4.
FIG. 6 is a cross sectional view showing the control mechanism of FIG. 5.

As shown in FIG. 5, the manipulated force of the manipulation lever 39 acts on one end of a balance lever 44, and the operating force of the actuator 41 acts on the other end of the balance lever 44. The aforesaid parking brake force acts on the intermediate portion of the balance lever 44. The balance lever 44 is connected through a coupling mechanism 45 with an equalizer 46. The coupling mechanism 45 includes a first coupling member 47 disposed adjacent the balance member 44, a second coupling member 48 disposed adjacent the equalizer 46, a cylindrical member 49 fixed to the first coupling member 47 so as to define a very small interstice between the cylindrical member 49 and a large diameter portion 48A of the second coupling member 48, a spring 50 interposed between the cylindrical member 49 and the large diameter portion 48A of the second coupling member 48, a brake force detecting switch or brake detecting means 51 engaged by the cylindrical member 49 and for detecting a brake force of the degree of creep prevention, and a relative position displacement detecting switches or relative position displacement detecting means 52 and 53 for detecting the relative position displacement between the manipulation lever 39 and the actuator 41.

The brake force detecting switch 51 detects the brake force by the movement of the cylindrical member 49 caused by the movement of the first coupling member 47. The relative position displacement detecting switch 52 detects the relative position displacement between the manipulation lever 39 and the actuator 41 by the tilt of the balance lever 44 caused by the manipulation of the manipulation lever 39, while the other relative position displacement detecting switch 53 detects the relative position displacement between the manipulation lever 39 and the actuator 41 by the tilt of the balance lever 44 caused by the operating force of the actuator 41. Each output of the relative position displacement detecting switches 52, 53 and the brake force detecting switch 51 is inputted to the control circuit 33, which controls the actuator 41 on the basis of each output of the relative position displacement detecting switches 52, 53, brake force detecting switch 51, manipulation switches 36, 37, accelerator detecting switch 35 and brake detecting switch 32. A bracket member denoted by 54 is adapted to fix the sheath of cables to the vehicle body.

Figure 7:
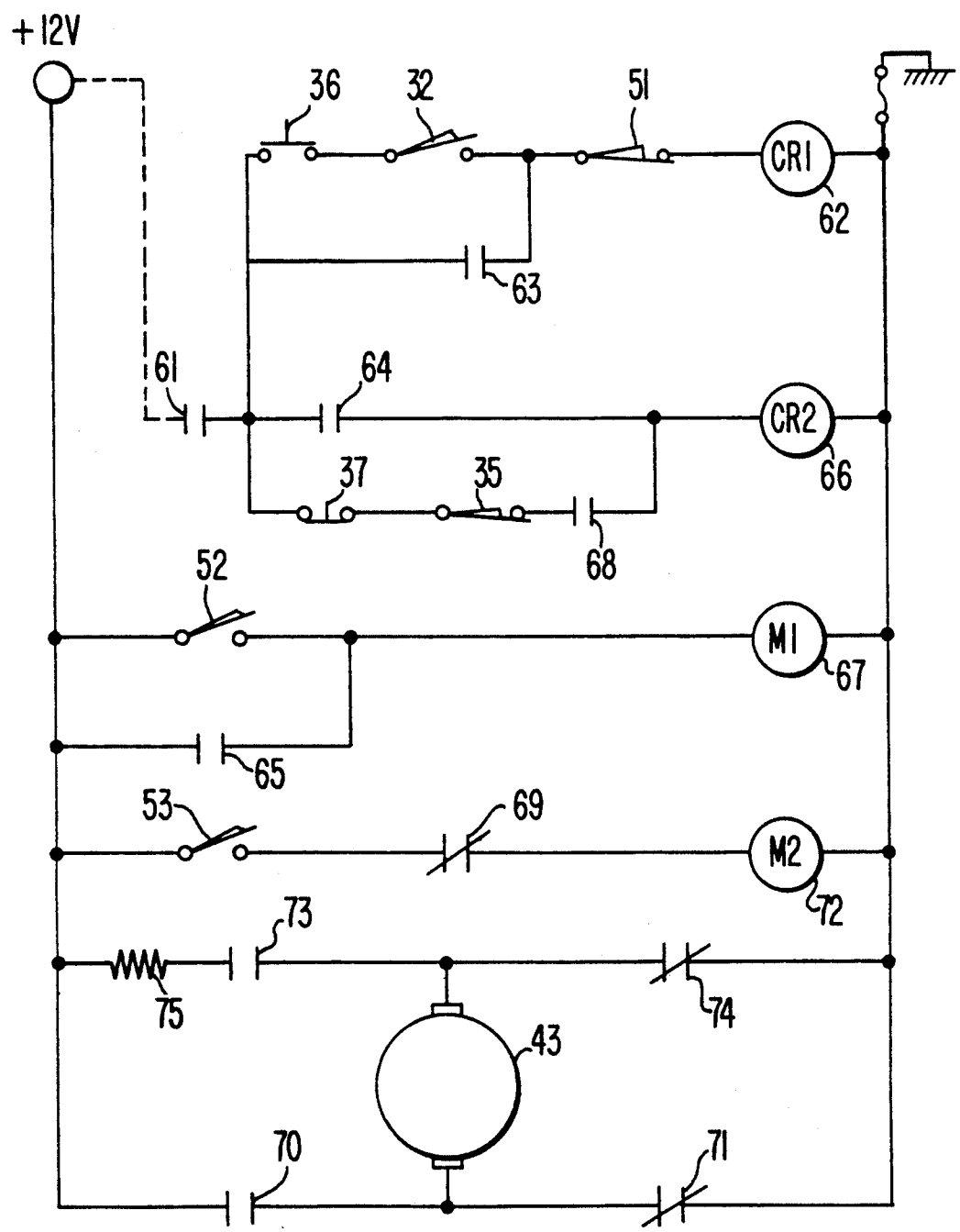
FIG. 7 is a diagram showing the control circuit of FIG. 4.

The control circuit 33 shown in FIG. 4 will hereinafter be described in conjunction with FIG. 7. In FIG. 7, a normally open contact of an ignition relay is designated by 61, a manipulation switch for operation by 36, a brake detecting switch by 32, a brake force detecting switch by 51 and a first relay for creep prevention by 62. 63, 64 and 65 are normally open contacts of the first relay 62, the contact 63 being adapted for self holding the first relay 62, the contact 64 being adapted for actuating a second relay 66 for holding a creep prevention state, and the contact 65 being adapted for actuating a third relay 67 for an electric motor.

37 is a manipulation switch for release, 35 an accelerator detecting switch, 68 a normally open contact of the second relay 66, and 69 a normally closed contact of the second rely 66.

52 is one relative position displacement detecting switch, 53 the other relative position displacement detecting switch, 70 a normally open contact of the third relay 67 for an electric motor, and 71 a normally closed contact of the third relay 67.

Also, 72 is a fourth relay for an electric motor and 73 a normally open contact 73 of the fourth relay 72, and 74 a normally closed contact of the fourth relay 72. An electric motor denoted by 43 constitutes the actuator 41, and a resistance 75 is provided between the battery charger 38 and the normally open contact 73 of the fourth relay 72. The electric motor 43 rotates in the positive direction, when the normally open contact 70 is closed and the normally closed contact 71 is opened by the operation of the third relay 67, and rotates in the reverse direction, when the normally open contact 73 is closed and the normally closed contact 74 is opened by the operation of the fourth relay 72.

The apparatus constructed as shown in FIGS. 4 through 7 will hereinafter be described in detail.

If the manipulation lever 39 is pulled up, the balance lever 34 will be tilted and therefore the relative position displacement detecting switch 52 is closed and the third relay 67 is turned on. When the normally open contact 70 is closed and the normally closed contact 71 is opened by the operation of the third relay 67, the electric motor 43 rotates in the positive direction and assists the manipulated force of the manipulation lever 39. Because of the positive rotation of the electric motor 43, the balance lever 34 becomes balanced. This causes the relative position displacement detecting switch 52 to be opened and also the third relay 57 to be turned off. As a result, the electric motor 43 is stopped. In this manner, the parking brake can be operated by both the manipulation lever 39 and the electric motor 43.

Next, if the manipulation lever 39 is returned to its original position, the balance lever 44 will be tilted, the other relative position displacement detecting switch 53 closed and the fourth relay 72 turned on. For this reason, since the normally open contact 73 is closed and the normally closed contact 74 is opened, the electric motor 43 rotates in the reverse direction. Because of the reverse rotation of the electric motor 43, the balance lever 44 becomes balanced. This causes the relative position displacement detecting switch 53 to open and also the fourth relay 72 to be turned off. As a result, the electric motor 43 is stopped. In this manner, the parking brake can be released.

Next, if the manipulation switch 36 is turned on with both the brake force detecting switches 32 and 51 closed, the first relay 62 will be turned on. This causes the normally closed contacts 63, 64 and 65 to be closed, and the first relay 62 is self held and the third relay 67 is turned on. Also, the second relay 66 is turned on, the normally open contact 68 is closed and self held, and the normally closed contact 69 is opened.

Since the normally open contact 70 is closed and the normally closed contact 71 is opened by the operation of the third relay 67, the electric motor 43 rotates in the positive direction. By the actuation of the electric motor 43, the balance lever 44 is tilted, the relative position displacement detecting switch 53 is closed, and since, on the other hand, the brake force detecting switch 51 is opened, the first relay 52 is turned off and the third relay 67 is also turned off. The electric motor 43 is consequently stopped. Thus, the parking brake can be operated by the manipulation of the manipulation switch 36.

Next, if the manipulation switch 37 is turned off, the second relay 66 will be turned off and the normally closed contact 69 that has been opened is closed. Also, since the relative position displacement detecting switch 53 has been closed, the fourth relay 72 is turned on. When the electric motor 43 is rotated in the reverse direction by the operation of the fourth relay 62 and thus the balance lever 44 becomes balanced, the relative position displacement detecting switch 53 is opened, the fourth relay 72 is turned off and therefore the electric motor 43 is stopped. Thus, the parking brake can be released by the manipulation switch 37 for release. It is noted that, if the accelerator pedal 34 is pressed down, the accelerator detecting switch 35 will be opened, and thus the parking brake can be automatically released As described above, according to the present invention, the parking brake can be operated and released by both the manipulation of the manipulation lever and manipulation switch, and the present invention becomes unexpensive since it employs the common actuator Also, in the case of the manipulation switch, the parking brake can be automatically released by the manipulation of the accelerator pedal.

While certain representative embodiments and details have been shown for the purpose of illustrating the invention, it will be apparent to those skilled in this art that various changes and modifications may be made therein without departing from the scope of the invention.

What we claim is:

1. A parking brake apparatus comprising:
   a manipulation lever;
   an actuator;
   a balance lever connected at its one end through a first coupling member with said manipulation lever so that a manipulated force of said manipulation lever acts on said one end and at its other end through a second coupling member with said actuator so that an operating force of said actuator acts on said other end, said balance lever having a portion on which a parking brake force acts;
   relative displacement detecting means for detecting a relative displacement between said manipulation lever and said actuator; and
   control means for controlling said actuator so that the relative displacement detected by said relative displacement detecting means is reduced.

2. A parking brake apparatus as set forth in claim 1, which further comprises stop means that is provided in the vicinity of said balance lever and adapted to regulate said balance lever so that said relative displacement is maintained less than a fixed value.

3. A parking brake apparatus as set forth in claim 1, wherein said first and second coupling members are freely slidable so that said balance lever can be moved when only one of said manipulation lever or said actuator is operated.

4. A parking brake apparatus as set forth in claim 1, wherein only one of said first and second coupling members is freely slidable so that said balance lever can be moved only when one of said manipulation lever or said actuator is operated.

5. A parking brake apparatus comprising:
   a parking brake manipulation lever for operating and releasing a parking brake;
   an actuator provided to reduce a manipulated force of said parking brake manipulation lever, the actuator being operated by manipulation of said parking brake manipulation lever;
   manipulation switch means for operating and releasing said actuator without manipulating said manipulation lever; and
   control means for controlling the operation and release of a parking brake caused by said actuator on the basis of an output of said manipulation switch means.

6. A parking brake apparatus as set forth in claim 5, wherein said control means comprises
   a balance lever having its one end on which the manipulated force of said manipulation lever acts, its other end on which the operating force of said actuator acts and its intermediate portion on which a brake force of said parking brake acts;
   relative position displacement detecting means for detecting a relative position displacement between said manipulation lever and said actuator;
   brake force detecting switch for detecting the brake force transmitted to said parking brake; and
   a control part for controlling said actuator on the basis of said output of said manipulation switch, an output of said relative position displacement detecting means and an output of said brake force detecting switch.

7. A parking brake apparatus as set forth in claim 6, wherein said control means further comprises brake manipulation detecting means for detecting a manipulated quantity of a brake pedal, and accelerator manipulation detecting means for detecting a manipulated quantity of an accelerator pedal, and when said manipulation switch is operated with a detection output of said brake manipulation detecting means obtained, said parking brake being operated by said actuator, and when a detection output of said accelerator manipulation is obtained after the operation of said parking brake, said parking brake being released by said actuator.

* * * * *